United States Patent
Bestmann

(10) Patent No.: US 9,451,129 B2
(45) Date of Patent: Sep. 20, 2016

(54) METHOD FOR CALCULATING A SPOT COLOR DATABASE

(71) Applicant: HEIDELBERGER DRUCKMASCHINEN AG, Heidelberg (DE)

(72) Inventor: Guenter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/884,315

(22) Filed: Oct. 15, 2015

(65) Prior Publication Data

US 2016/0112604 A1 Apr. 21, 2016

(30) Foreign Application Priority Data

Oct. 20, 2014 (DE) .......................... 10 2014 221 207

(51) Int. Cl.
| | | |
|---|---|---|
| H04N 1/60 | (2006.01) | |
| B41F 33/00 | (2006.01) | |
| B41F 33/16 | (2006.01) | |
| H04N 1/54 | (2006.01) | |
| H04N 1/52 | (2006.01) | |

(52) U.S. Cl.
CPC ......... H04N 1/6008 (2013.01); B41F 33/0036 (2013.01); B41F 33/16 (2013.01); H04N 1/52 (2013.01); H04N 1/54 (2013.01); H04N 1/603 (2013.01); H04N 1/6019 (2013.01)

(58) Field of Classification Search
USPC ....................................................... 358/504
See application file for complete search history.

(56) References Cited

U.S. PATENT DOCUMENTS

| | | | |
|---|---|---|---|
| 8,537,420 B2 | 9/2013 | Bestmann | |
| 8,654,395 B2 | 2/2014 | Bestmann | |
| 8,810,857 B2 | 8/2014 | Bestmann | |
| 2008/0111997 A1* | 5/2008 | Edge | H04N 1/6016 358/1.9 |
| 2011/0013207 A1 | 1/2011 | Chauvin et al. | |
| 2012/0250095 A1* | 10/2012 | Bestmann | B41F 33/0036 358/2.1 |

FOREIGN PATENT DOCUMENTS

| | | |
|---|---|---|
| DE | 102010007858 A1 | 8/2011 |
| DE | 102011012806 A1 | 9/2011 |
| DE | 102011015306 A1 | 10/2012 |

* cited by examiner

*Primary Examiner* — Ngon Nguyen
(74) *Attorney, Agent, or Firm* — Laurence A. Greenberg; Werner H. Stemer; Ralph E. Locher

(57) ABSTRACT

A method for calculating spectral data records for spot colors includes the steps of generating or selecting spectral characterization data of a printing process; selecting colorimetrically defined spot colors from a color table; calculating the spectrum of the spot colors based on the spectral characterization data on a white printing substrate and on a black printing substrate; calculating the spectrum of the halftone spot colors from the spectra of the spot colors on a white substrate and on a black substrate; adapting the spectra of the spot colors to a defined white printing substrate; adapting the spectra of the spot colors to the predetermined values from the color table; adapting the spectra of the spot colors to a defined black printing substrate; and adapting the spectral dot gains to a defined standard. The calculated spectral data record are used for color control in a printing press.

12 Claims, 3 Drawing Sheets

METHOD FOR CALCULATING A SPOT COLOR DATABASE

CROSS-REFERENCE TO RELATED APPLICATION

This application claims the priority, under 35 U.S.C. §119, of German application DE 10 2014 221 207.3, filed Oct. 20, 2014; the prior application is herewith incorporated by reference in its entirety.

BACKGROUND OF THE INVENTION

Field of the Invention

The invention lies in the technical field of electronic reproduction technology.

The present invention relates to a method for calculating a spot color database, that is, for calculating spectral data records for spot colors by way of a computer.

Special or spot colors are used in the creation of original artwork that is to be printed. The object is to achieve an unambiguous, verifiable reproduction of colors. Spot colors are determined with the aid of color fans or based on measured color values of color samples. Spot colors are characterized by color values. In general, the CIELAB color system is used to define the color by three color coordinates L*, a*, and b*. Known spot color systems include the RAL system, the HKS system, and the PANTONE system.

To calculate how to overprint process colors and spot colors or two or more spot colors and to set up and control the printing process, spot colors need to be characterized in a spectral way. Yet the determination of the spectra of spot colors by experiment, i.e., by sample prints, is a complex and time-consuming process.

Various mathematical models are used to describe spectrally characterized spot colors. One of these models is the spectral Kubelka-Munk model. That model describes the reproduction of a color (spot color or process color) on a printing substrate by way of two spectral parameters: scattering $S(\lambda)$ and absorption $K(\lambda)$. With known parameters, forecasts can be made for printing with layers of varying thickness on a substrate. The substrate may be colored and needs to be described by a spectrum.

The combined printing of two or more colors may be divided into individual steps:
  a. A first color is printed onto the printing substrate.
  b. A second color is printed on top of the first color and/or onto the printing substrate.
  c. A third color is printed on top of the first color and/or of the second color and/or onto the printing substrate.

The steps may be carried out iteratively for further colors.

The scattering parameter $S(\lambda)$ and the absorption parameter $K(\lambda)$ are determined by printing a color sample onto a light printing material or substrate (paper white) and onto a dark printing material or substrate (paper black). The dark printing substrate may be simulated by printing black onto a light printing substrate. Different forms of the Kubelka-Munk model are known. Here, the following equation is used to calculate the spectrum of the reflection of the color on a substrate:

$$R(\lambda) = \frac{1 - Rg(\lambda)(a - b)\coth(bS(\lambda)X)}{a - Rg(\lambda) + b\coth(bS(\lambda)X)} \text{ where } a = 1 + \frac{K(\lambda)}{S(\lambda)},$$

-continued
$$b = \sqrt{(a^2 - 1)}, \text{ and}$$

$R(\lambda)$=reflection coefficient of the color on the substrate,
$Rg(\lambda)$=reflection coefficient of the substrate,
$S(\lambda)$=scattering coefficient of the color,
$K(\lambda)$=absorption coefficient of the color, and
X=relative layer thickness of the ink.

The scattering coefficients $S(\lambda)$ and the absorption coefficients $K(\lambda)$ are determined in an iterative calculation (two equations with two unknowns) from sample prints of the color on a light and on a dark printing substrate.

Spectra of the colors are not generally available and need to be determined by sample prints. To calculate how colors are to be printed on top of each other in accordance with the Kubelka-Munk principle, the spectra of the light and dark printing substrates and the color on the light and dark printing substrates are required. However, providing sample prints on a light substrate and on a dark substrate is complex, time-consuming and expensive.

The Kubelka-Munk model is not well suited for creating color gradients and to calculate the overprinting of halftone colors. Layer thicknesses X of the ink and tone values of the color are insufficiently correlated or not correlated at all. A halftone value of 80% of the color, for instance, does not correspond to a layer thickness XR=0.8 X. A correlation needs to be established by experiments, i.e., by sample prints of halftone colors. This, too, is a complex, time-consuming and expensive process.

Another known approach to determine halftone colors on light and dark substrates is the Yule-Nielsen model.

Based on the fundamental assumptions that:
the reflection factor of the color changes proportionally to the area coverage,
that the reflection factor within the halftone cell behaves additively, and
that the eye cannot resolve a halftone cell,
the Murray-Davies model applies for a single color:

$$(R(\lambda) = a \times R_{(\lambda, 100\%)} + (1-a) \times R_{(\lambda, Paper)})$$

The spectrum of a halftone is composed of the proportions of the spectra of the primary color and of the white of the paper. The coefficient a describes the proportion of the area of the halftone. Since in general area coverage changes during printing in the form of mechanical and optical dot gain, the above equation includes an error. Thus with the intention of including dot gain in the model, Yule and Nielsen introduced an additional factor n to the above equation:

$$R(\lambda) = [a \times R_{\lambda, 100\%}^{1/n} + (1-a) \times R_{\lambda, Paper}^{1/n}]^n$$

The factor n needs to be determined by experiments. This is usually done by comparing the calculated spectrum to a printed and measured test data record (step wedge). Color values are determined from the calculated spectrum and compared to the measured color values (dE evaluation). The factor is varied until the color difference is at a minimum. If this is not possible, the value n=2 is a good approximation. The remaining error is eliminated by a correction of the dot gain.

Another important variable for setting up and controlling a printing process is dot gain. For the typical process colors CMYK, there are clear guidelines both for the measurement and calculation and for the magnitude of the dot gain of the individual tone values. Corresponding density values are calculated from the spectra of the paper, the halftone process color values, and the solids of the process colors. In addition, colorimetric and spectral densities may be calculated. Colorimetric densities are calculated from the XYZ color values; spectral densities are calculated from the spectral values that exhibit maximum absorption. The latter is advantageous in particular for spot colors.

The tone values $A_D$ in the print may be calculated as a function of the density values:

$$A_D = \frac{10^{-D_0} - 10^{-D}}{10^{-D_0} - 10^{-D_n}}$$

where $D_0$ is the density value of the paper, $D_n$ is the density value of the solid and D is the density of the halftone value for which the tone value in the print is to be determined. The dot gain is obtained after subtraction of the tone value of the original $A_V$.

$$TWZ = A_D - A_V$$

The desired dot gains for a printing process are defined in the associated process standards. ISO 12647-2 in particular specifies a number of dot gains with various values in the halftone and various gradients. Correction values for the tone values may be determined by a comparison of the measured actual dot gain and the target dot gain. To make unequivocal forecasts and ensure unequivocal reproduction of halftone spot colors, a defined dot gain for the spot colors is required.

The following data format for saving color spectra of solid tone values and halftone values is based on the above observations on the Kubelka-Munk model, the Yule-Nielsen model, and on dot gain in the print:

The spectrums of the color are determined and saved, for instance, in steps of 0%, 10%, 20%, ..., 100% on both the light printing substrate and the dark substrate. Different steps involving more or fewer fields or other tone values are possible. Intermediate values between the individual steps are determined by linear interpolation.

The spectral coefficients of the Kubelka-Munk equation may be calculated from four respective corresponding color fields (e.g. 0% and 40% on the light printing substrate and 0% and 40% on the dark printing substrate).

The spectral dot gain may be calculated from the color fields of the light substrate. The wavelength at which the calculation is carried out may be saved in the data format. The best possible representation of the process colors CMYK may likewise be saved in the data format.

An application known from the prior art is the calculation of the overprinting of process colors CMYK and spot colors. In printing practice, there are several options for the order of the colors:

a. The process colors are printed first and the spot color is printed afterwards (CMYK first).
b. The spot color is printed first and the process colors are printed afterwards (SPOT first).
c. Process colors and spot colors are printed in the order of increasing lightness.

In accordance with the "CMYK first" option, the first step is to determine the spectrum of overprinted process colors by linear interpolation from a spectral characterization data record. This spectrum then is the substrate $Rg(\lambda)$ for the Kubelka-Munk equation. The effect of the spot color is then calculated for the now colored substrate.

In accordance with the "SPOT first" option, the first step is to determine the spectrum by linear interpolation from the spot color data record. Then the process colors on the substrate are successively calculated with the aid of the Kubelka-Munk equations. For this purpose, spectral spot color data records for the process colors CMYK are extracted from the characterization data record.

In accordance with the third option, the first step is to determine the spectrum for the process colors that are printed before the spot color by linear spectral interpolation. Then the spot color is printed onto the now colored substrate with the aid of the Kubelka-Munk equation and subsequently the remaining process colors are printed. For this purpose, spectral spot color data records for the CMYK process colors are extracted from the characterization data record.

A common feature of all these options is that they neglect the ink absorption behavior. Initially the calculation is based on a layer thickness factor X=1.0. This is acceptable if the printing process is a wet-on-dry printing process (e.g. when the ink is applied directly to the substrate) and the actual layer thickness of the print corresponds to that of the spot color characterization. An enhancement is to introduce a variable layer thickness X to simulate wet-on-wet printing. Depending on the tone vale, typical values for X range between 0.82 (high tone value) and 0.96 (low tone value).

Thus the known prior art for calculating and selecting suitable spot colors involves a number of problems mainly in terms of time and effort. To calculate overprinting in particular, a collection of spectral characterizations of spot colors and process colors is necessary in a data format in which the spot colors and process colors are saved in uniform tone value steps on a black substrate and on a white substrate. However, the process of providing sample prints of all spot colors on a light substrate and on a dark substrate, measuring the spectra, and processing the measured values to obtain spectral characterizations of spot colors is extremely complex, time-consuming and expensive.

SUMMARY OF THE INVENTION

It is accordingly an object of the invention to provide a method of calculating a spot color data bank which overcomes the above-mentioned and other disadvantages of the heretofore-known devices and methods of this general type and which provides for a more efficient, less time-consuming method than the heretofore known methods of the prior art for calculating the spectral characterizations of spot colors for a printing process. The method is to be based on a spectrally characterized printing process and to be versatile enough to accommodate the use of different substrates.

With the foregoing and other objects in view there is provided, in accordance with the invention, a method of calculating spectral data records for spot colors by way of a computer. The novel method comprises:

generating or selecting spectral characterization data of a printing process;

selecting colorimetrically defined spot colors from a color table;

calculating a spectrum of the spot colors based on the spectral characterization data on a white printing substrate and on a black printing substrate;

calculating a spectrum of halftone spot colors from the spectra of the spot colors on the white substrate and on the black substrate;

adapting the spectra of the spot colors to a defined white printing substrate;

adapting the spectra of the spot colors to predetermined values from the color table;

adapting the spectra of the spot colors to a defined black printing substrate;

adapting spectral dot gains to a defined standard; and using the calculated spectral data record for color control in a printing press.

The described method may be used to calculate the spectra of the spot colors from the spectral characterization data of a printing process with a high degree of accuracy. This is an immense advantage over the prior art because the spectra of the spot colors no longer need to be determined empirically by measurements of spot color sample prints. The spectra are saved in a spectral data record and in a format that allows the overprinting to be calculated in a simple and precise way and the printing process to be easily set up, monitored and controlled.

Advantageous and thus preferred further developments of the method will become apparent from the associated dependent claims and the description in connection with the associated drawings.

In accordance with an added feature of the invention, the calculated spectral data records of the spot colors are written into and saved in a database that is connected to the control unit of the printing press.

Once the spectral spot color data records have been calculated, it is expedient to save them in a spot color database. When this spot color is to be used again, the corresponding data record may be accessed in the database, eliminating the need for a recalculation.

In accordance with an additional feature of the invention, a color table of target spot colors is used and a spectral data record is generated for all target spot colors by means of the method described above and is saved in the database.

The most efficient approach to create such a spot color database is to create a color table including all desired spot colors and to generate a spectral data record for all spot colors in the table in the database by means of the disclosed method.

In accordance with a preferred further development, the spectral data records saved in the database for the spot colors are used to calculate the printing behavior of the spot color in combination with one or more other printing colors in a printing process without buffering the spectra.

In this process, the spectra of the spot color are directly used to calculate an overprinting of a spot color and another color in a printing process without buffering the spectra in a data record. The starting data used for this process are the spectral data records of the spot colors saved in the database. Yet it is likewise possible to carry out the overprinting subsequent to the disclosed method. In this case, the spectral data record generated in this way is used directly and no entry in the database is created.

In accordance with a further feature of the invention, for one target spot color, multiple data records are saved in the database for different paper color values and/or multiple data records are saved in the database for different printing processes.

For each spot color to be calculated, more than one spectral data record may be created and saved in the database. This occurs if data records for different paper color values or printing processes are required. In this case, the database entries for each spot color need to be ordered in an appropriately structured way.

In accordance with another preferred further development, for different printing processes, the corresponding spectral characterization data describing the respective printing process are to be used.

If data records for different printing processes are required, the corresponding spectral characterization data that describe the printing process are to be used or calculated.

In accordance with again an added feature of the invention, the spectral data record is to be adapted to modified paper color values using spectral and colorimetric processes.

If data records for different paper color values are required, the corresponding spectral data record that has been calculated is to be adapted to the new paper color values.

In accordance with a preferred further development, the spectral characterization data describing the printing process are calculated by linear interpolation from a test element in accordance with ISO 12642-2.

If the spectral characterization data that describe the printing process have not yet been calculated, this may be done on the basis of a test element in accordance with ISO 12642-2.

In accordance with a preferred further development, the spectral characterization data that describe the printing process are calculated by means of modified and segmented spectral Neugebauer equations on the basis of an optimized test element with a small number of color fields.

Another option is to calculate the spectral characterization data that describe the printing process on the basis of an optimized test element with a small number of color fields.

In accordance with a preferred further development, the calculation of the spectrum of halftone spot colors on a light substrate and on a dark substrate is carried out by means of the spectral Yule-Nielsen equation.

To calculate the spectrum of halftone spot colors on a light substrate and on a dark substrate, the use of the spectral Yule-Nielsen equation is suitable.

In accordance with another preferred further development, the adaptation of the spectra of the spot colors to a defined white printing substrate, to the predetermined values of the color table, and to a defined black printing substrate is achieved in an iterative process to minimize the difference between the respective actual color values and the target color values of the spectra of the spot colors.

An iterative process is suitable to adapt the spectra of the spot colors to a defined white printing substrate, to the predetermined values from the color table, and to a defined black printing substrate to minimize the difference between the respective actual color values and the respective target color values of the spectra of the spot colors.

In accordance with a concomitant feature of the invention, for an adaptation of the spectral dot gain values of the spot colors to a defined standard, the corrected tone values are calculated from the spectra in two steps wherein the first step is to convert the spectra into tone values of the characterization data record and the second step is to convert these tone values to the original tone values with the aid of the segmented spectral Neugebauer equation.

To allow the corrected tone values to be calculated, they first need to be calculated from the spectra. Then they may be adapted to the defined standard by means of the segmented spectral Neugebauer equation.

Although the invention is illustrated and described herein as embodied in a method for calculating a spot color database, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
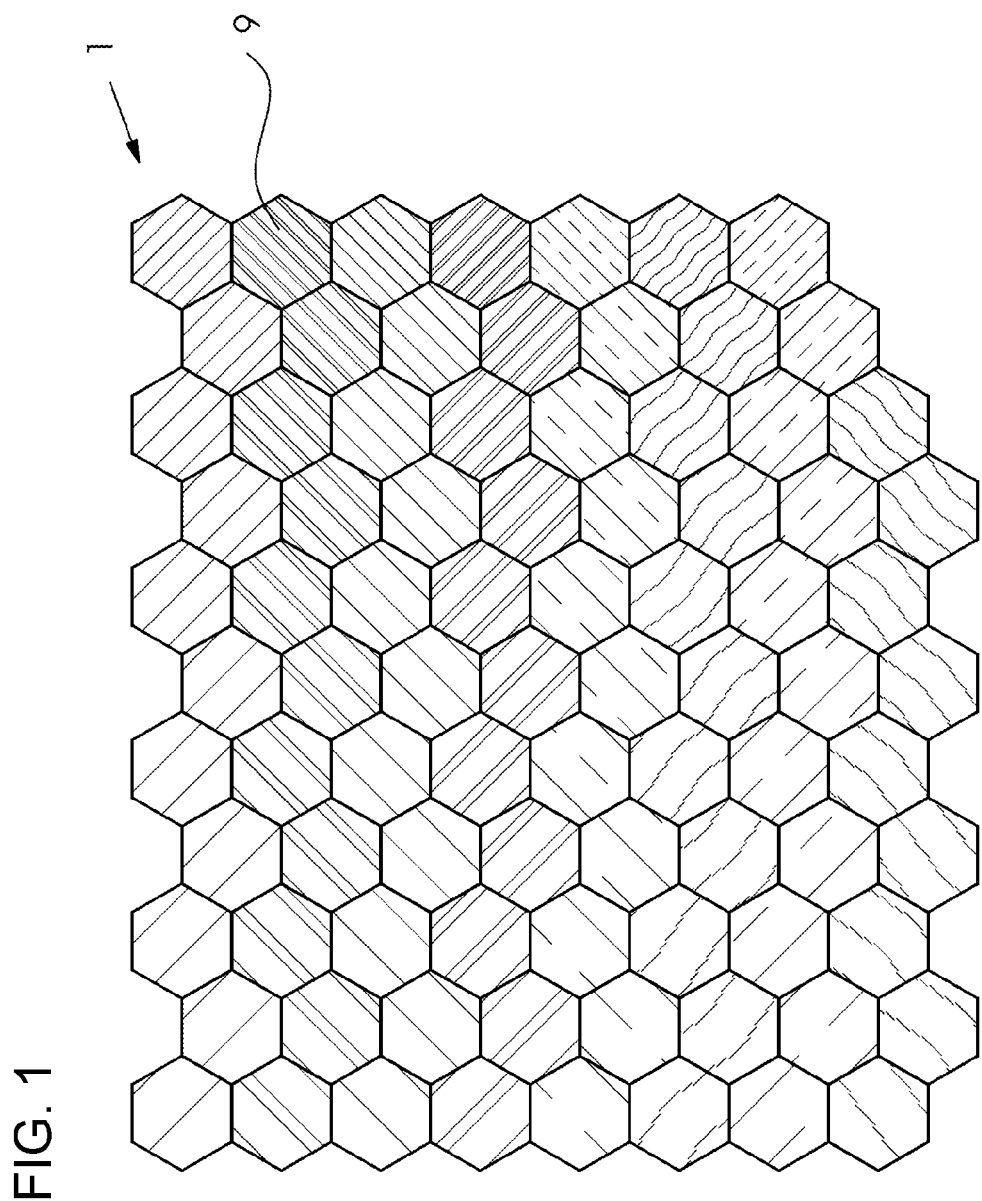
FIG. 1 is an example of a spot color database in the form of a color fan.

Referring now to the figures of the drawing in detail and first, particularly, to FIG. 1 thereof, there is shown a color fan 1 as an example of a spot color database 4. A color fan 1 is a color database in which the respective spot color values are available as printed color values, which may be used as a starting point for the spot color table 1 which lists the spot colors to be calculated for which the spectral data records 5 are to be created.

Figure 2:
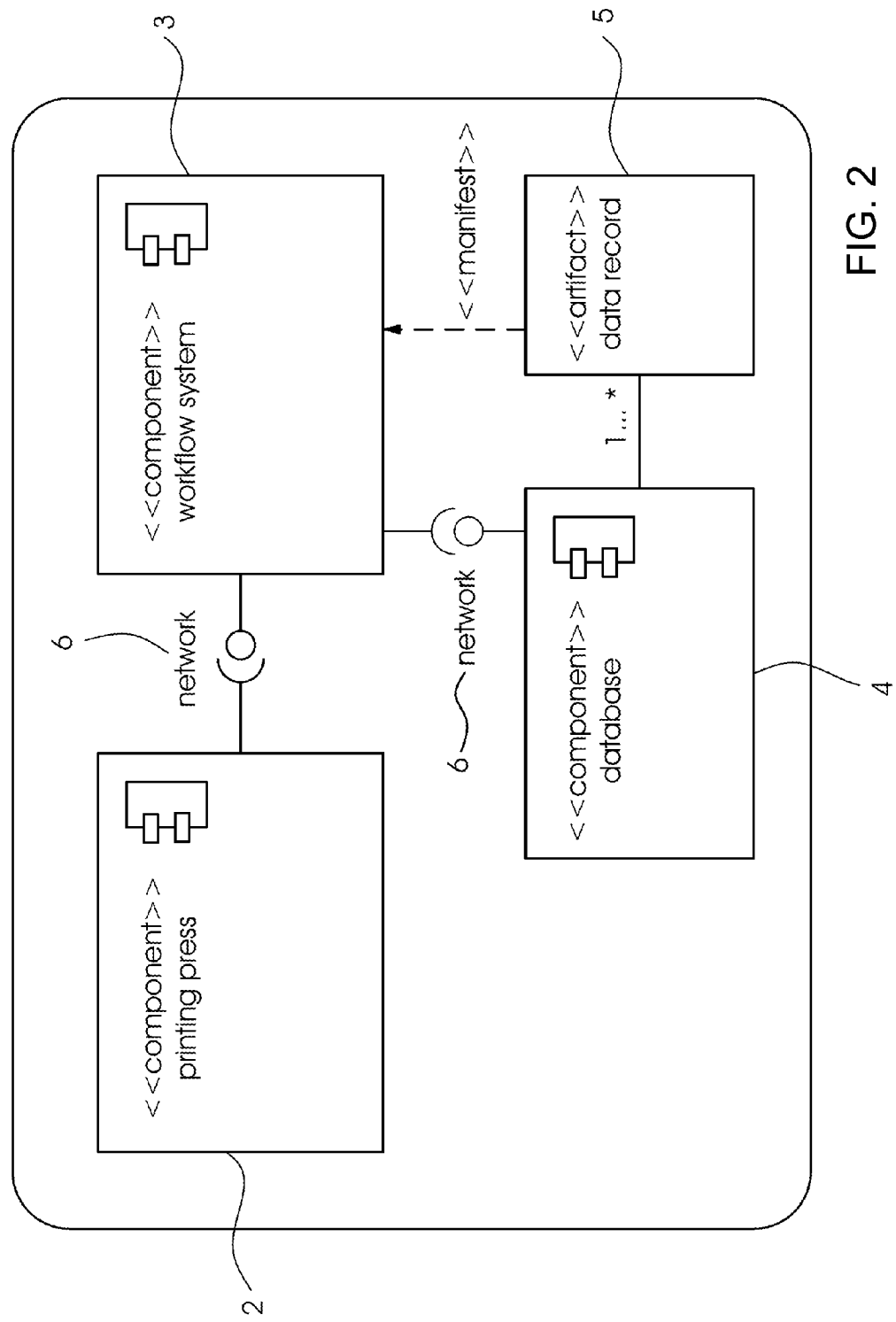
FIG. 2 illustrates the structure of the required infrastructure.

However, to be used for color control purposes in a printing press, the spectral data records 5 need to be available in digitized form. For this purpose, a specific infrastructure is required. A complete system suitable for using these data records 5 and for implementing the method of the invention is illustrated in a simplified way in FIG. 2. In a general overview, the system consists of the printing press 2 itself and a computer-assisted workflow system 3 connected to the machine 2 via a network 6 to control the machine 2. To save and access the spectral data records 5, some form of a digital database 4 needs to be available. The precise structure of the required hardware may vary in accordance with the requirements of the respective user.

Figure 3:
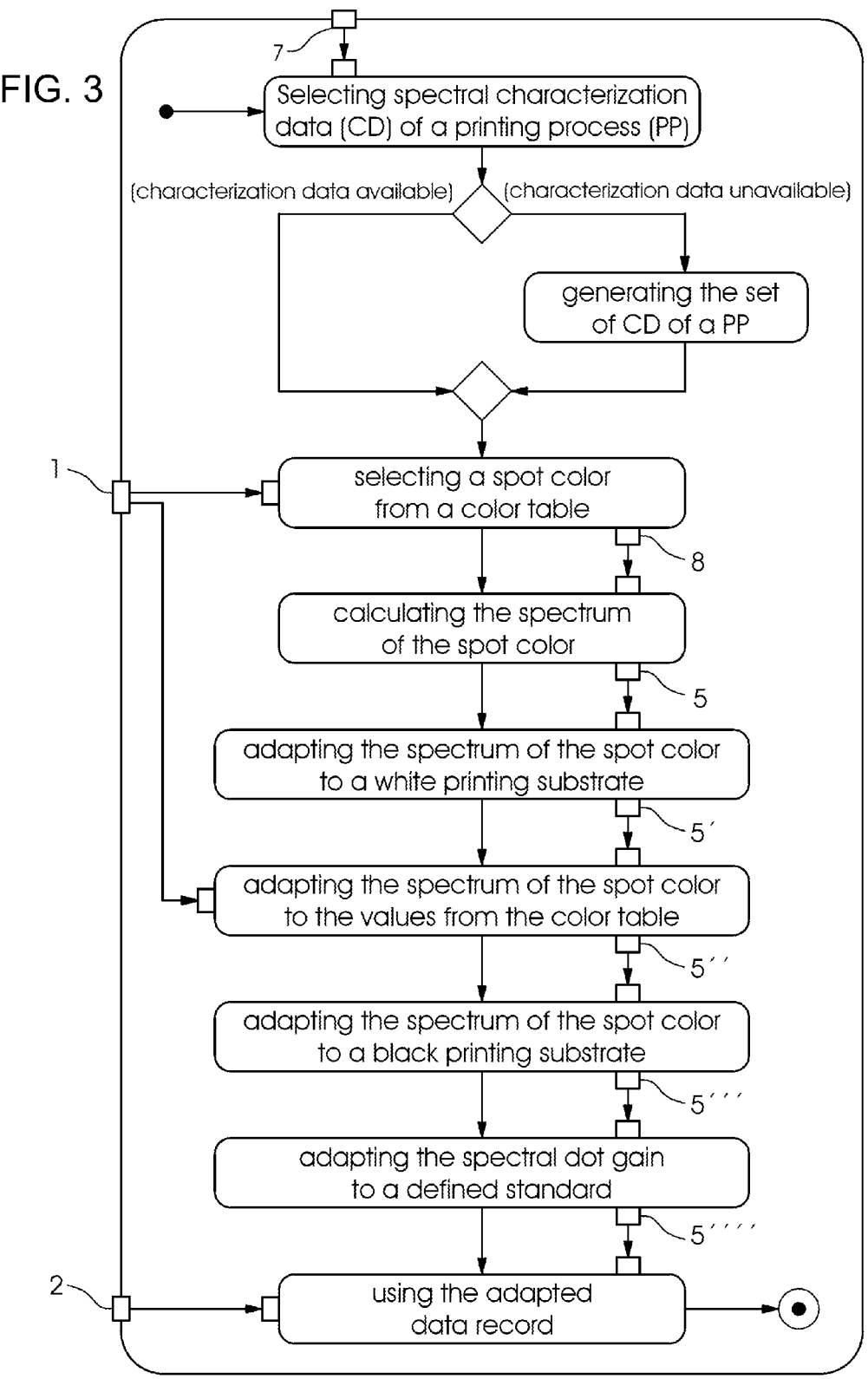
FIG. 3 is a flow chart of the method of the invention.

A flow chart of a preferred embodiment of the method of the invention is shown in FIG. 3. The invention describes a method in which the spectral characterization data of spot colors and process colors for a printing process may be calculated from a spectral characterization of the printing process. Digital color management and digital data exchange between documents in the printing process require unequivocal relationships between the digital tone values and the printed color values. In general, the digital tone values are available as CMYK process color values. The printed color values are dependent on the printing process (sheet-fed offset printing, web-fed offset printing, gravure, flexographic printing), process standard (coloration, dot gain) and materials used (printing substrate, printing ink). The digital tone values and the associated color values are referred to as characterization data. Characterization data records are determined with the aid of test forms or targets. A known test form is the one described in ISO 12642-2, which consists of defined color fields of the CMYK process colors.

In general, carrying out a characterization of a printing process is a time-consuming and expensive task. In the characterization of the printing process, the devices (printing press 2 and plate exposure device) involved in the process are taken into account. In general, a characterization will only be carried out if no known characterization data are available. These days, characterization data are usually available as colorimetric data in a CIEXYZ and CIELAB format. Spectra are usually not available. For this application, spectral characterization data are required. A method for calculating spectral characterization data from an optimized test element based on a very small number of color test fields is known in the art. With the aid of the modified and segmented spectral Neugebauer equations, standardized characterization data records may be calculated from this test element. These data records are distinguished by the fact that spectra are provided for the individual color values and that the spectra of any desired tone value combinations may be calculated. It is also known from the prior art to adapt available spectral characterization data of printing processes to predetermined reference values.

When the characterization data of the printing process have been selected or created, the next step is to select the target spot color for which the spectral data record 5 is to be calculated. As indicated above, the target spot color is taken from a spot color table 1 that includes the corresponding colorimetric data. The table 1 contains a color name and a color value. In some cases, there are even CMYK representations related to a defined printing process. Spectra are not available, or if they are, they are available only as a spectrum of the color value.

For the color value selected from the spot color table 1, the associated spectrum may be calculated in an interpolation or calculation process from a spectral characterization data record of a printing process. This is done as follows:

a) The characterization data describe a forward model of a printing process, i.e. a representation of the CMYK tone values on color values and spectra. In a regularly graduated subset of the CMY tone values, an iterative process is used to find the CMY tone value combination that differs the least from the desired color for the given color value of the spot color. The iterative process required for this purpose is described in German Patent Application No. 10 2011 012 806 A1.

b) For the established tone value combination CMY (with K=0%), the spectrum of the solid tone on a light substrate is calculated from the characterization data.

c) For the established tone value combination CMY (with K=100%), the spectrum of the solid tone on a dark substrate is calculated form the characterization data.

d) The spectrum of the light substrate is obtained from the paper white (C=M=Y=K=0%) of the characterization data.

e) The spectrum of the dark substrate is obtained from the black value (C=M=Y=0% and K=100%) of the characterization data. In the case of an ISO12642-2 target, the spectra are calculated by a linear interpolation process and in the case of a minimized target, the spectra are calculated by means of the spectral segmented Neugebauer equations.

For the selected halftone values (e.g. a gradation in 10% steps of the tone values from 10% to 90%) of the spot color gradient on a light substrate and on a dark substrate, the spectral Yule-Nielsen equation is used.

The spectral characterization data of a printing process refer to a defined printing substrate under a defined printing condition. This substrate may, for instance, be a substrate as defined in ISO 12647-2:2013 or a different substrate. If the printing specifications require a different substrate of a paper white deviating from the spectral characterization data, the characterization data of the spot color need to be converted. It is possible temporarily to convert the characterization data of the printing process before the beginning of the calculations described above or to convert the characterization data of the spot color.

As the determination of the spectrum of the spot color may be inaccurate, in particular if the color value of the spot color is outside the color space of the printing process, the next step in the method is a spectral adaptation to the exact color value.

A further adaptation is necessary if the color black that is to be used has a different color value and deviates from the spectral characterization data. For the spectral characterization data of a printing process refer to a defined color value of the black printing ink. This value results from the technical restrictions of the printing process in terms of the maximum amount of ink that may be transferred to the printing substrate in a stable process. Thus a conversion of the characterization data of the spot color is necessary if the black ink deviates.

In addition, for accurate process control, a uniform or at least a precisely defined dot gain of the spot color is necessary. The dot gain may be calculated from the characterization data of the spot color on the light printing substrate. When a uniform dot gain is desired, it may be implemented by means of the characterization data of the spot color. Since in this case the tone values are modified and not the spectra, a conversion of the spectra in terms of the corrected tone values is necessary to ensure uniform tone value gradation in all characterization data.

Once these steps have been completed, the generated and adapted spectral data record 5'– for the selected spot color may be used for color control purposes in the printing press 2. This refers to controlling the spot color itself and to the overprinting behavior in combination with other process colors.

The data record 5'''' that has been created is simultaneously saved in a database 4 accessible through a network 6, allowing it to be reused without recalculation when the same spot color is to be used again. If the spectral characterization data for all color values of the spot color table 1 and of the process colors are saved in a database as described above, with a uniform color value for the substrate and a uniform color value for the black on the substrate and a uniform spectral dot gain, a complete database 4 of spectral spot color data records 5 may be created. The database 4 is related to the printing process defined by the characterization data, to the spot color table 1, and to the adaptations that have potentially been made.

The spot color database 4 may be generated for different paper hues in a printing condition. A spot color database 4 may be generated for different printing processes. Thus for an identical spot color table 1, a high degree of conformity is ensured when the spot colors are simulated in a print.

The invention claimed is:

1. A method of calculating spectral data records for spot colors by way of a computer, the method comprising:
    generating or selecting spectral characterization data of a printing process;
    selecting colorimetrically defined spot colors from a color table;
    calculating a spectrum of the spot colors based on the spectral characterization data on a white printing substrate and on a black printing substrate;
    calculating a spectrum of halftone spot colors from the spectra of the spot colors on the white substrate and on the black substrate;
    adapting the spectra of the spot colors to a defined white printing substrate;
    adapting the spectra of the spot colors to predetermined values from the color table;
    adapting the spectra of the spot colors to a defined black printing substrate;
    adapting spectral dot gains to a defined standard; and
    using the calculated spectral data record for color control in a printing press.

2. The method according to claim 1, which comprises saving the calculated spectral data records of the spot colors in a database that is connected to a control unit of the printing press.

3. The method according to claim 2, which comprises using a color table of target spot colors and generating a spectral data record for all target spot colors and saving same in the database.

4. The method according to claim 2, which comprises using the spectral spot color data records saved in the database to calculate a printing behavior of the spot color in combination with one or more other printing colors in a printing process without buffering the spectra.

5. The method according to claim 2, which comprises saving multiple data records for one target spot color in the database for different paper color values and/or saving multiple data records in the database for different printing processes.

6. The method according to claim 5, which comprises using for different printing processes the respective spectral characterization data describing the printing process.

7. The method according to claim 5, which comprises, when the paper color values change, adapting the spectral data record by way of spectral and colorimetric processes.

8. The method according to claim 1, which comprises calculating the spectral characterization data describing a printing process by linear interpolation from a test element in accordance with ISO 12642-2.

9. The method according to claim 1, which comprises calculating the spectral characterization data describing a printing process from an optimized test element with a small number of color fields by way of modified and segmented spectral Neugebauer equations.

10. The method according to claim 1, which comprises calculating the spectrum of the halftone spot colors on a light substrate and on a dark substrate by way of a spectral Yule-Nielsen equation.

11. The method according to claim 1, which comprises carrying out each of the steps of adapting the spectra of the spot colors to the defined white printing substrate, to the predetermined values of the color table, and to the defined black printing substrate by an iterative process to minimize a difference between the respective actual color values and the target color values of the spectra of the spot colors.

12. The method according to claim 1, which comprises, for an adaptation of the spectral dot gains of the spot colors to the defined standard, calculating corrected tone values from the spectra in two steps, a first step being to convert the spectra into tone values of the characterization data record and a second step being to convert the tone values to the original tone values with the aid of a segmented spectral Neugebauer equation.

* * * * *